US012079367B2

United States Patent
Dange et al.

(10) Patent No.: US 12,079,367 B2
(45) Date of Patent: *Sep. 3, 2024

(54) SYSTEM AND METHOD FOR ENABLING SOCIAL NETWORK USERS TO GRANT THEIR CONNECTIONS GRANULAR VISIBILITY INTO THEIR PERSONAL DATA WITHOUT GRANTING THE SAME VISIBILITY TO THE NETWORK OPERATOR

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/481,474

(22) Filed: Sep. 22, 2021

(65) Prior Publication Data

US 2022/0004661 A1   Jan. 6, 2022

Related U.S. Application Data

(63) Continuation-in-part of application No. 17/018,273, filed on Sep. 11, 2020, now Pat. No. 11,582,032.

(Continued)

(51) Int. Cl.
*G06F 21/62* (2013.01)
*G06F 21/32* (2013.01)
(Continued)

(52) U.S. Cl.
CPC .......... *G06F 21/6245* (2013.01); *G06F 21/32* (2013.01); *H04L 9/14* (2013.01); *H04L 9/3231* (2013.01); *H04L 63/061* (2013.01); *H04L 63/0861* (2013.01); *H04L 9/0662* (2013.01); *H04L 9/0866* (2013.01)

(58) Field of Classification Search
CPC ....... G06F 21/6245; G06F 21/32; H04L 9/14; H04L 9/3231; H04L 63/061; H04L 63/0861; H04L 9/0662; H04L 9/0866
See application file for complete search history.

(56) References Cited

U.S. PATENT DOCUMENTS 6,401,206 B1 * 6/2002 Khan .................... H04L 9/3247
713/176
7,013,290 B2   3/2006 Ananian
(Continued)

FOREIGN PATENT DOCUMENTS

JP       4675660 B2    10/2006
JP     2014127164 A    7/2014

OTHER PUBLICATIONS

Non-Final Rejection for U.S. Appl. No. 17/018,273 mailed Jun. 22, 2022 including PTO-892 attached thereto (12 pgs).
(Continued)

*Primary Examiner* — Cheng-Feng Huang
(74) *Attorney, Agent, or Firm* — Shumaker, Loop & Kendrick, LLP (57) ABSTRACT

A system and method for enabling social network users to grant their connections, granular visibility into their personal data without granting the same visibility to the network operator.

8 Claims, 5 Drawing Sheets

Related U.S. Application Data (60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
  *H04L 9/14* (2006.01)
  *H04L 9/32* (2006.01)
  *H04L 9/40* (2022.01)
  *H04L 9/06* (2006.01)
  *H04L 9/08* (2006.01)

(56) References Cited

U.S. PATENT DOCUMENTS

| | | | |
|---|---|---|---|
| 7,039,805 B1 | 5/2006 | Messing | |
| 7,093,131 B1 | 8/2006 | Kobayashi | |
| 7,340,438 B2 | 3/2008 | Nordman et al. | |
| 7,496,191 B1 | 2/2009 | Crews et al. | |
| 7,769,633 B2 | 8/2010 | Jokinen et al. | |
| 8,170,615 B2 | 5/2012 | Vanska et al. | |
| 9,633,269 B2 | 4/2017 | Gu et al. | |
| 10,136,191 B1 | 11/2018 | Lewis et al. | |
| 10,489,826 B2 | 11/2019 | Matthews et al. | |
| 10,530,577 B1 | 1/2020 | Pazhoor et al. | |
| 11,252,479 B2 | 2/2022 | Lewis et al. | |
| 2003/0028451 A1 | 2/2003 | Ananian | |
| 2003/0135740 A1* | 7/2003 | Talmor | H04L 9/3231 713/186 |
| 2006/0085844 A1* | 4/2006 | Buer | H04L 9/3263 726/4 |
| 2007/0271463 A1* | 11/2007 | Ginter | H04N 21/25875 713/176 |
| 2008/0072068 A1 | 3/2008 | Wang et al. | |
| 2009/0271634 A1 | 10/2009 | Boult et al. | |
| 2012/0033807 A1* | 2/2012 | Asim | G06F 21/606 380/44 |
| 2014/0006290 A1 | 1/2014 | Hozanne et al. | |
| 2015/0006895 A1* | 1/2015 | Irvine | G06F 21/6209 713/171 |
| 2015/0046699 A1* | 2/2015 | Benteo | G06F 21/35 713/155 |
| 2015/0095999 A1 | 4/2015 | Toth | |
| 2015/0134552 A1 | 5/2015 | Engels et al. | |
| 2015/0269389 A1* | 9/2015 | Lee | H04L 63/0861 726/5 |
| 2015/0280921 A1 | 10/2015 | Geoffrey | |
| 2016/0050213 A1* | 2/2016 | Storr | H04L 9/32 726/6 |
| 2016/0219046 A1* | 7/2016 | Ballard | H04L 63/0861 |
| 2017/0141920 A1* | 5/2017 | Herder, III | H04L 9/30 |
| 2017/0372059 A1* | 12/2017 | Sindia | H04L 63/08 |
| 2018/0173871 A1 | 6/2018 | Toth | |
| 2018/0307859 A1 | 10/2018 | LaFever et al. | |
| 2019/0097812 A1 | 3/2019 | Toth | |
| 2019/0182176 A1* | 6/2019 | Niewczas | G10L 17/24 |
| 2019/0306151 A1* | 10/2019 | Hamel | H04L 9/3247 |
| 2020/0204545 A1 | 6/2020 | Pacella et al. | |
| 2020/0266989 A1* | 8/2020 | Krcmaricic-Barackov | H04L 9/30 |
| 2020/0296093 A1* | 9/2020 | Hoyos | H04L 9/3247 |
| 2021/0058246 A1* | 2/2021 | Stolbikov | H04L 9/0841 |
| 2021/0091937 A1 | 3/2021 | Dange et al. | |
| 2022/0004613 A1 | 1/2022 | Dange et al. | |
| 2022/0004619 A1 | 1/2022 | Dange et al. | |
| 2022/0006815 A1 | 1/2022 | Dange et al. | |

OTHER PUBLICATIONS

Final Rejection for U.S. Appl. No. 17/018,273 mailed Sep. 14, 2022 (15 pages).

Notice of Allowance (NOA) for U.S. Appl. No. 17/018,273 mailed Dec. 5, 2022 (10 pages).

Sy et al. "Generation of Cryptographic Keys from Personal Biometrics: An Illustration Based on Fingerprints." dated Nov. 28, 2021, pp. 1-35.

Hochrieser, "Online Dating Can Benefit From Identity Verification And Biometric Authentication In 2019", Information Security Buzz, dated Jul. 18, 2019 pp. 1-5.

Arsenova, "Face Liveness Detection For Safe Biometric Authentication And Face Recognition", dated Jan. 27, 2020, pp. 1-10.

M. Kapko et al., "What is Windows Hello? Microsoft's biometrics security system explained" dated Jan. 12, 2021, pp. 1-5.

Mjaaland et al., "Biocryptics: Towards Robust Biometric Public/Private Key Generation", The Norwegian Information Security Conference (NISK) dated 2009, pp. 27-42.

Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.

Notice of Allowance (NOA) issued for U.S. Appl. No. 17/481,468, mailed Apr. 26, 2024 (10 pages).

Corrected Notice of Allowance issued for U.S. Appl. No. 17/481,465, mailed Apr. 15, 2024 (6 pages).

Corrected Notice of Allowance issued for U.S. Appl. No. 17/481,465, mailed Mar. 29, 2024 (6 pages).

Corrected Notice of Allowance issued for U.S. Appl. No. 17/481,465, mailed Mar. 13, 2024 (7 pages).

Corrected Notice of Allowance issued for U.S. Appl. No. 17/481,478, mailed Apr. 17, 2024 (4 pages).

Corrected Notice of Allowance issued for U.S. Appl. No. 17/481,478, mailed Mar. 29, 2024 (4 pages).

Notice of Allowance (NOA) issued for U.S. Appl. No. 17/481,465 mailed Feb. 28, 2024 (8 pages).

Notice of Allowance (NOA) issued for U.S. Appl. No. 17/481,478 mailed Feb. 28, 2024 (11 pages).

Corrected Notice of Allowability issued for U.S. Appl. No. 17/481,478, mailed Mar. 7, 2024 (2 pages).

Non-Final Office Action (NFOA) issued for U.S. Appl. No. 17/481,478 mailed Jan. 31, 2024 (11 pages).

Non-Final Office Action (NFOA) issued for U.S. Appl. No. 17/481,465 mailed Feb. 1, 2024 (8 pages).

Non-Final Office Action (NFOA) issued for U.S. Appl. No. 17/481,468, mailed Mar. 21, 2024 (11 pages).

\* cited by examiner

SYSTEM AND METHOD FOR ENABLING SOCIAL NETWORK USERS TO GRANT THEIR CONNECTIONS GRANULAR VISIBILITY INTO THEIR PERSONAL DATA WITHOUT GRANTING THE SAME VISIBILITY TO THE NETWORK OPERATOR

CROSS-REFERENCE TO RELATED APPLICATIONS AND PRIORITY

The present application is a Continuation in Parts (CIP) application of U.S. Complete application Ser. No. 17/018,273 filed on Sep. 11, 2020 entitled "System and method for sharing user preferences without having the user reveal their identity", which claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and U.S. Provisional Application No. 63/029,717 filed on May 26, 2020 entitled "Method and system of storing identity and signature using the human body as a node."

TECHNICAL FIELD

The present subject matter described herein, in general, relates to a system and a method for sharing user's personal data. More specifically, the present subject matter discloses the system and method for enabling social network users to grant their connections, granular visibility into their personal data without granting the same visibility to the network operator.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, software applications require people to provide their identity as well as personal information in order to receive personalized services. However, this practice has resulted in several undesirable outcomes. People end up creating a different profile for each application such as Gmail™, Twitter™, Amazon™ etc. As the number of profiles increases, it becomes difficult to manage these profiles. On an average an online user has 7.6 social media accounts. Many of these online profiles are created using fake identities. An estimated 30% of profiles on social media are based on fake identities. Moreover, in the existing social networking platforms, there is no barrier to keep a user from creating a profile that corresponds to someone other than themselves. Furthermore, users don't always have control over their online profile's visibility to others within or outside of their own human network. User privacy is also at risk as different applications have different privacy standards.

Additionally, software applications often collect more personal information from users than is needed to provide the application's functionality. This information may be misused by these software applications for targeted advertising. Generally, the information captured by these software applications is used to run advertising campaigns targeted at social media audience cohorts whose attributes are extrapolated from their online activity. This may include the web searches they perform, the content they consume, and the social media posts they engage with. This method poses several limitations. The search and social media platforms that track users' activity often have access to users' identity. Although social media platforms mask their users' identity from advertisers and developers, there is a massive burden on the social media platforms to protect their users' identity and keep it hidden from advertisers and developers at all times. More importantly, users' identity is not hidden from the platforms themselves, thereby creating an exception for the platforms in respect of the rule applied to the advertisers that no single entity should have access to people's identity as well as activity.

Furthermore, ecommerce businesses such as Amazon™ and eBay™ capture users' activity data on one product platform and apply it to other products using shared cookies. Users often have no visibility into which businesses have access to what part of their personal information. The collection of users' attributes and preferences is a one-way flow. Platforms gather users' activity data and retain it permanently. Users have no control over their own activity data once it has been captured by the platform. Moreover, users do not use platforms with the intention of providing the platforms with their personal information. Therefore, finding themselves to be the target of advertisements based on specific personal attributes detected by platforms makes them feel violated. Platforms algorithmically interpret people's engagement data to deduce their attributes and preferences. Hence, there is a level of abstraction between users' actual attributes and preferences, and those targeted by businesses in their advertising campaigns on platforms.

Also, there is an inherent limit to how deeply businesses can understand a user's real attributes and preferences. Users do not know how much of their personal information and preferences that they did not share with anyone intentionally is stored and shared by platforms. This causes widespread anxiety and stress among people. Conversely, in the absence of users' activity on social media platforms, there is insufficient data to extrapolate their attributes and preferences. People's attributes and preferences also change over time. Their activity on various platforms may not reflect all the changes. Businesses may continue to target users in their advertisements even if they no longer have the attributes they are being targeted for.

Furthermore, users' identities on the interne are stored on a network server. The server requires resources to host users' identities, keep them secure, and perform regular maintenance. Users do not always have control over their digital identity stored on the server. Every identity on the server does not necessarily correspond to a unique person. In the existing art there is no known way to prevent the storage of identities. People need to manage credentials to access their own identities on the servers.

To address some of the above issues and to manage credentials of a multitude of applications, Single Sign-On mechanisms such as OAUTH and SAML are used. The Single Sign-on mechanism allows applications to use tokens and transfer the burden of authentication to federated identity providers such as Google™ and Apple™. During the handoff from a third-party authentication to the client application, typically, personally identifiable information such as name, email, profile photo, etc., is also shared with the client application in an opt-out manner. This reintroduces vulnerabilities in the client application and negates the separation of identity authentication in the first place. Even if no personally identifiable information is handed off to the client application, the third-party authentication system is still susceptible to the same security challenges and all weaknesses are passed on downstream.

Another technique adopted for security is two-factor authentication. There are several ways by which two-factor authentication can be enabled in order to provide an additional layer of security. One method is by sending a code over email or text message. This assumes that the client application has access to the user's email or phone number which, if true, also means that they have the ability to determine the user's identity with relative ease. Additionally, if the user's phone or email are compromised, this system works in favor of the perpetrator and further injures the victim. Another method of two-factor authentication is enabled by generating a code via a separate authentication application. It assumes that the user has control over that authentication application. If the user loses access to the authenticator application, they lose access to their identity manager. Yet another method of two-factor authentication is enabled by having the user remember a pass-phrase, a visual shape, or answers that they made up for a number of personal questions, or any variant thereof. This usually results in an unreasonable barrier for the user and a bad user experience.

Furthermore, historically personalized software applications require users to set a username (unique string, email, or phone number) and a password, in order to have secure access to a personalized account. In case the username is the user's email or phone number, the user's identity is revealed to the application. If the username is a string, the application still requires the user's email or phone number to enable the user to reset the password if it is lost.

Emails and phone numbers are not private. Unlisted phone numbers and email addresses can be traced back to their owners with relative ease. When people register on a service using their email address or phone number, their identity becomes vulnerable to attacks. History indicates that it is almost certain that every user's personal information will be leaked at some point. In recent times there are an increasing number of cases, where personal data of millions of social media users has been leaked and posted online. And since their accounts with all services are tied to either an email, or a phone number, or both, when data from multiple services are compromised, leaked information can be combined, resulting in further injury to the users whose data is leaked.

The world's most powerful technology companies have utterly failed to protect people's privacy. This is primarily because they are continuing to use peoples' emails or phone numbers to uniquely identify them within their systems. While only the most high-profile data breaches get reported, a vast majority of data breaches go unreported. Overall, there is overwhelming evidence demonstrating that online privacy does not exist in any meaningful way.

Thus, clearly the most effective way for any company to prevent their users' privacy from being breached is to not have their systems access their users' identities in the first place. As demonstrated in USPTO patent application Ser. No. 17/018,273 filed on Sep. 11, 2020 entitled "System and method for sharing user preferences without having the user reveal their identity", an application can very well provide personalized services to users without having access to their identity, and indeed to their personally identifiable information.

Present social networking platforms provide users with very limited control over their identity and their personal data. Users' personal data is stored on centralized servers managed by the social networks, and users cannot set fine-grained permissions regarding who can access what part of their personal data.

Further, the social networks themselves have unlimited access to the users' personal data. Users have no choice but to trust the social networks to safeguard their personal data and not misuse it in any way.

Thus, there is a long-felt need for enabling social network users to grant their connections granular visibility into their personal data without granting the same visibility to the network operator.

SUMMARY

This summary is provided to introduce concepts related to a system and a method for enabling social network users to grant their connections, granular visibility into their personal data without granting the same visibility to the network operator, and the concepts are further described below in the detailed description. This summary is not intended to identify essential features of the claimed subject matter nor is it intended for use in determining or limiting the scope of the claimed subject matter.

In one implementation, a system for enabling social network users to grant their connections, granular visibility into their personal data without granting the same visibility to the network operator, is illustrated in accordance with an embodiment of the invention. The system comprises a processor and a memory coupled to the process. The processor is configured to execute program instructions stored in the memory for registering a user. For the purpose of registering the user, the processor may execute program instructions stored in the memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), capture personal information of the user, wherein the personal information is classified into a first degree personal information, second degree personal information and other personal information, store the Unique-Number (N1) on a user device and in a data repository, and store the Public-Key (P1) on a storage device. Further, the processor may execute program instructions stored in the memory to identify a set of connections associated with the user and classify the set of connections, associated with the user, into a set of first degree connections, a set of second degree connection, a set of third degree connection, and a set of other people. Further, the processor may execute program instructions stored in the memory to capture a set of privacy settings corresponding to each of the set of first degree connections, the set of second degree connections, the set of third degree connections, and the set of other people, wherein the set of privacy settings are captured from the user, wherein the first degree personal information is accessible to the set of first degree connections, wherein the second degree personal information is accessible to the set of second degree connections, and wherein the third degree personal information is accessible to the set of third degree connections, and wherein the other personal information is accessible to the set of other people. Once the user is registered, each time the user makes a request to access the system, the processor may execute program instructions stored in the memory to authenticate the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the processor may execute program instructions stored in the memory to enable the set of first degree connections, the set of second degree connections, the set of third degree connections, and the set of other people to access the personal information based on the set of privacy settings.

In another implementation, a method for enabling social network users to grant their connections granular visibility into their personal data without granting the same visibility to the network operator, is illustrated in accordance with an embodiment of the invention. The method may comprise one or more steps for registering a user. For the purpose of registering the user, a processor may execute program instructions stored in a memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), capture personal information of the user, wherein the personal information is classified into a first degree personal information, a second degree personal information, a third degree personal information, and other personal information, store the Unique-Number (N1) on a user device and in a data repository, and store the Public-Key (P1) on the storage device. Further, the method may comprise one or more steps to identify a set of connections associated with the user, classify the set of connections, associated with the user, into a set of first degree connections, a set of second degree connections, a set of third degree connections, and a set of other people. Further, the method may comprise one or more steps to capture a set of privacy settings corresponding to each of the set of first degree connections, the set of second degree connections, the set of third degree connections, and the set of other people, wherein the set of privacy settings are captured from the user. The first degree personal information is accessible to the set of first degree connections, the second degree personal information is accessible to the set of second degree connections, and the third degree personal information is accessible to the set of third degree connections, and the other personal information is accessible to the set of other people. Once the user is registered, the method may comprise one or more steps for authenticating the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the method may further comprise one or more steps to enable the set of first degree connections, the set of second degree connections, the set of third degree connections, and the set of other people to access the personal information based on the set of privacy settings.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
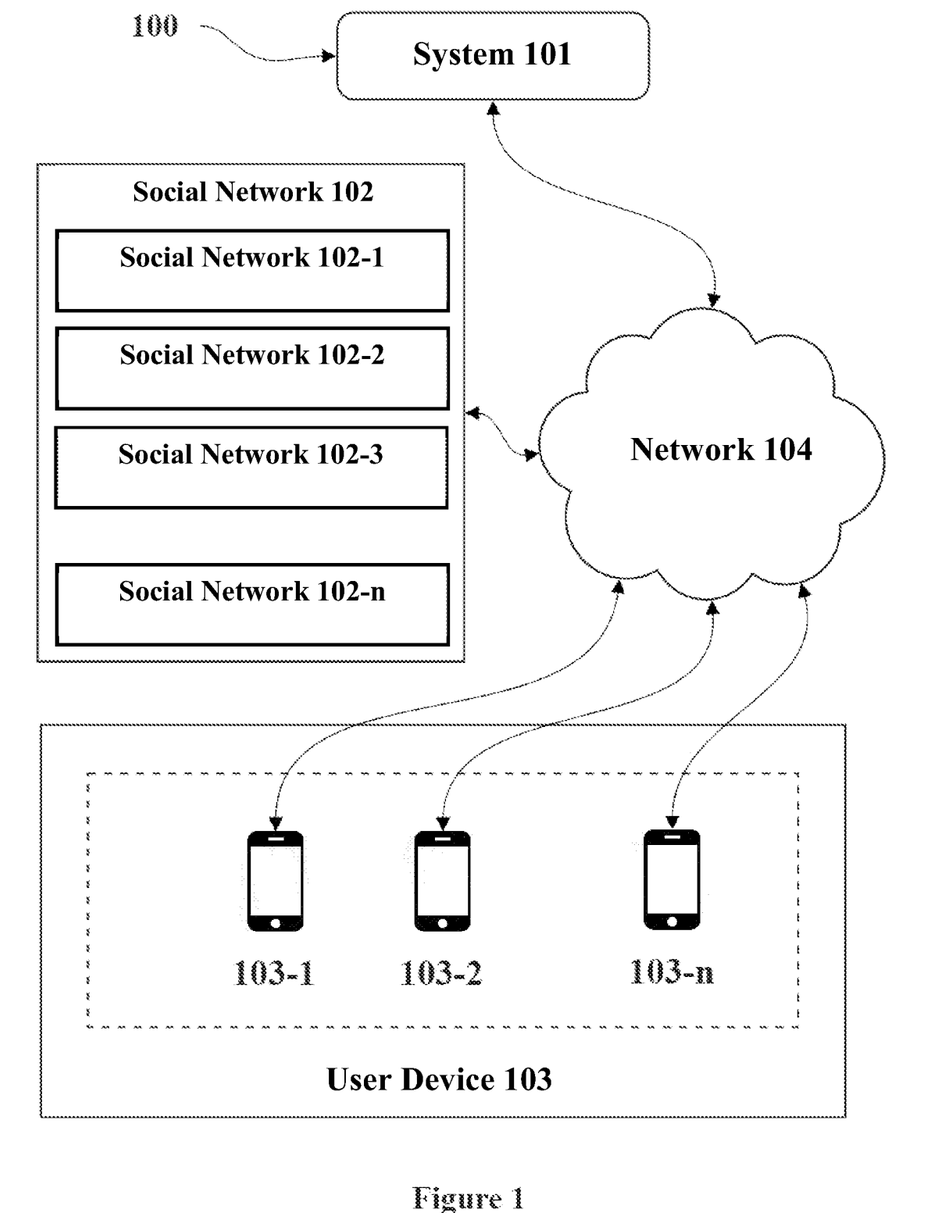
FIG. 1 illustrates a network implementation 100 of a system 101 for sharing a user's personal data, in accordance with an embodiment of the present disclosure.

Referring to FIG. 1, implementation 100 of system 101 for sharing a user's personal data is illustrated, in accordance with an embodiment of the present subject matter. In one embodiment, the system 101 may comprise a processor and a memory. Further, the system 101 may be connected to user devices and social networks through a network 104. It may be understood that the system 101 may be communicatively coupled with multiple users through one or more user devices 103-1, 103-2, 103-3 . . . , 103-n and social networks 102-1, 102-2, 102-3 . . . , 102-n collectively referred to as a user device 103 and social network 102.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the social network 102 may be any networking platform, media platform, messaging platform, ecommerce platform, or any other application platform. The system 101 may be configured to register users as well as social networks over the system 101. Further, the system may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Furthermore, the user devices 103 are also enabled to maintain a distributed global people's registry. The Distributed Global People Registry may be an autonomous free public utility that stores the public-key of every registered person.

In one embodiment, the social network 102 may be a networking platform, an ecommerce platform, or any other internet-based software application which requires user authentication before providing the user with access to the social network 102. The user registration process is further illustrated with the block diagram in FIG. 2.

Figure 2:
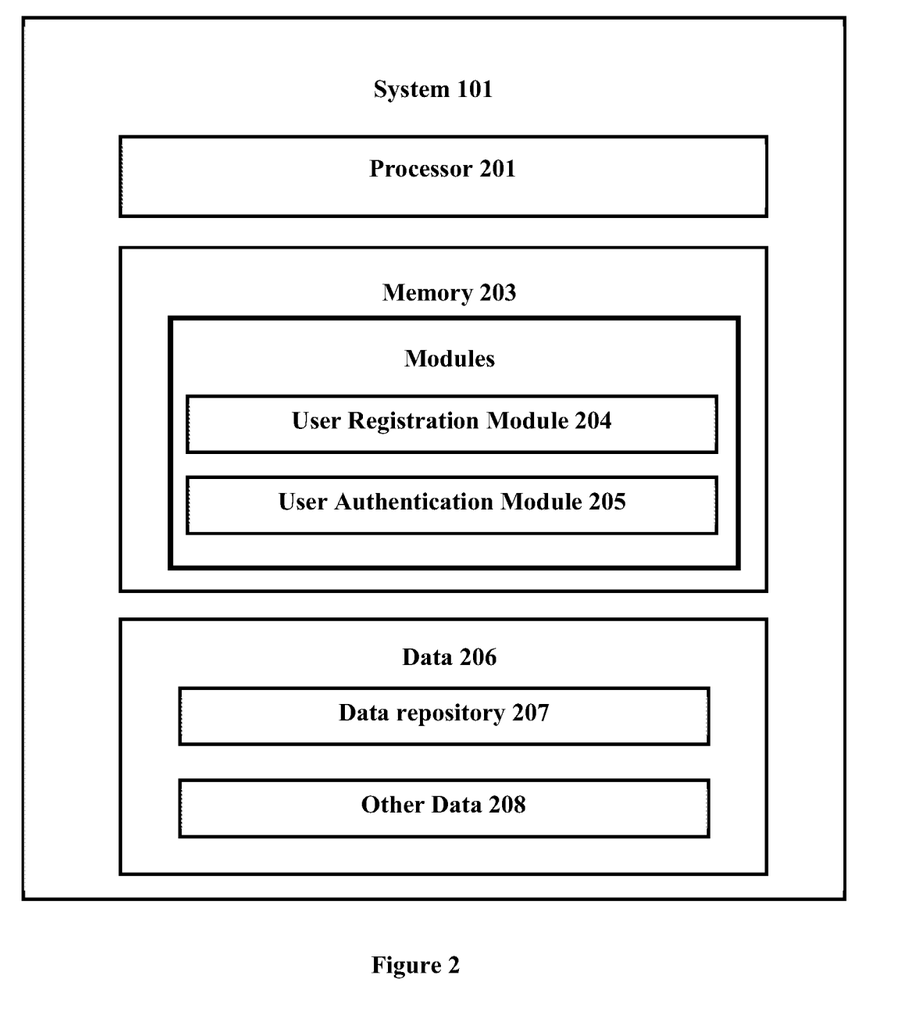
FIG. 2 illustrates components of the system 101 for sharing the user's personal data, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory consists of a set of modules. The set of modules may include a user registration module 204 and a user authentication module 205. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions 205 may include routines, programs, objects, components, data structures, etc., which perform particular tasks, functions, or implement particular abstract data types. The data 207 may comprise a data repository 208, and other data 209. The other data 209 amongst other things, serves as a repository for storing data processed, received, and generated by one or more components and programmed instructions. The working of the system 101 will now be described in detail referring to FIGS. 1 and 2.

In one embodiment, the processor 201 may be configured for executing programmed instructions corresponding to user registration module 204 for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein. It must be understood that the one or more biometric factors are not limited only to fingerprint, face, voice, retina, and palm vein. Any other biometric factors which can uniquely identify a user may be collected from the user. The set of biometric samples may be captured by the user device 103 and sent to the system 101 for registration. Further, the processor 201 is configured to process the set of biometric samples to compute a Secret-Key (S1) corresponding to the user. For the purpose of computing the Secret-Key (S1) a set of unique characteristics of the biometric samples may be determined. These unique characteristics must be reproducible every time the user scans their biometrics. Further, the processor 201 is configured to generate a Unique-Number (N1). The Unique-Number (N1) can be computed using any random number generation algorithm known in the art. The Unique-Number (N1) is a random number generated only once by the random number generation algorithm. Further, the processor 201 is configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1). In alternative embodiments, the Function (F1) may be based on any other encryption technique that is known in the art.

Further, the processor 201 is configured to store the Public-Key (P1) of the user on the storage device. The storage device can be internal memory of the user device 103. The storage device can also be virtual memory enabled over a remote server of a cloud storage space. In a similar manner, multiple users may be registered over the system 101. Every time the user makes a request to access the system 101, the Unique-Number (N1) and the Public-Key (P1) is used for authentication. It must be noted that the Secret-Key (S1) is not stored on the user device 103 or the system 101. Rather, at the time of authentication, a Secret-Key is computed in real-time.

Furthermore, after the registration process is complete, the processor 201 may be configured to capture the personal information of the user registered with the system 101. The system 101 may enable a user interface for capturing the personal information associated with the user. The personal information may comprise details such as Name (legal, professional, stage, pseudonym, and the like), Address (permanent, current, office, others), Health (medical conditions, exercise routine, diet plan, and so on). The personal information may be maintained at the user device 103 associated with the user. Furthermore, the personal information may be stored on the user device 103 in an encrypted format. The personal information may be classified into different categories and stored at the user device 103. The user may provide inputs in order to classify her personal data into different categories. The user may regularly update her personal information as well as the categories associated with the personal information. Since the user has complete control over the personal data stored in the user device 103, the user has control over which part of the personal data is visible to other users, in a network 102, that are directly or indirectly associated with the user. For example, the user has the flexibility to impose restrictions on a subset of connections (first degree connections) from a set of connections associated with the user, over the network 102, such that only a limited amount of personal information is visible to the subset of connections.

It must be noted that some of the social networks in the art allow their users to impose restrictions on what type of data can be accessed by which type of connection in that social network. However, these restrictions are platform specific and cannot prevent the user's personal data from getting compromised through other networks. Also, it is extremely difficult and time consuming for the user to impose restrictions on each and every social media network that the user has registered with. To address this problem, the system 101 enables the user to store all her personal information at a secure location and define a common set of privacy settings on this personal information such that these restrictions are automatically applied to each social network 102 associated with the user. The process of classifying the set of connections and categorizing the personal information associated with the user is illustrated as below.

In one embodiment, the processor 201 is configured to identify a set of connections associated with the user. The set of connections may be associated with any of the social networks 102. The processor 201 is configured to classify the set of connections, associated with the user, into a set of first degree connections, a set of second degree connections, a set of third degree connections, and a set of other people. The processor 201 is further configured to capture a set of privacy settings corresponding to each of the set of first degree connections, the set of second degree connections, the set of third degree connections, and the set of other people. The set of privacy settings are captured from the user with the help of the user.

In one embodiment, personal information associated with the user may be classified into first degree personal information, second degree personal information, third degree personal information, and other personal information based on user inputs. The first degree personal information may include personal data associated with the user such as full name, personal contact details, age, photos, and the like. The second degree personal information may include personal data associated with the user such as professional contact, other connections, and the like. The third degree personal information may include personal data associated with the user such as educational qualification, job experience, and the like. The other personal information may include personal data associated with the user which is not included in the first, second or third degree personal information.

The first degree personal information may be accessible to the set of first degree connections. Further, the second degree personal information is accessible to the set of second degree connections. Furthermore, the third degree personal information is accessible to the set of third degree connections and other personal information is accessible to the set of other people.

Once the set of connections, associated with the user, are classified, the process for user authentication is initiated each time the user attempts to access the system 101. The process for user authentication is stated as below.

In one embodiment, the processor 201 may be configured for executing programmed instructions corresponding to user authentication module 205 for authenticating the user. Initially the processor 201 may execute programmed instructions stored in the memory for receiving a biometric sample from the user. The biometric sample may be captured from the user in real-time. Further, the processor 201 may execute programmed instructions stored in the memory for processing the biometric sample to generate a Secret-Key (S2). It must be noted that the Secret-Key (S2) will be different from Secret-Key (S1) if the user is not the same person. Further, the processor 201 may execute programmed instructions stored in the memory for fetching the Public-Key (P1) corresponding to the user from the user device 103. Further, the processor 201 may execute programmed instructions stored in the memory for computing a Real-Time-Unique-Number (N2) using the Public-Key (P1), the Secret-Key (S2) and the Function (F1). Furthermore, the processor 201 may execute programmed instructions stored in the memory for authenticating the user based on comparison of the Real-Time-Unique-Number (N2) with the Unique-Number (N1) stored on the user device 103. It must be noted that when biometric samples from the same user are captured, the Secret-Key (S2) which is generated in real-time is the same as the Secret-Key (S1) which was used during user registration. As a result, the Real-Time-Unique-Number (N2) generated using the Public-Key (P1), the Secret-Key (S2) and the Function (F1) will be the same as the Unique-Number (N1). In case false biometrics are provided during authentication, the Secret-Key (S2) generated in real-time will not be the same as the Secret-Key (S1). Due to this, the Real-Time-Unique-Number (N2) will not be equal to the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

If the user is successfully authenticated, the processor 201 may execute programmed instructions stored in the memory for enabling the set of first degree connections, the set of second degree connections, the set of third degree connections, and the set of other people to access the personal information based on the set of privacy settings.

Figure 3:
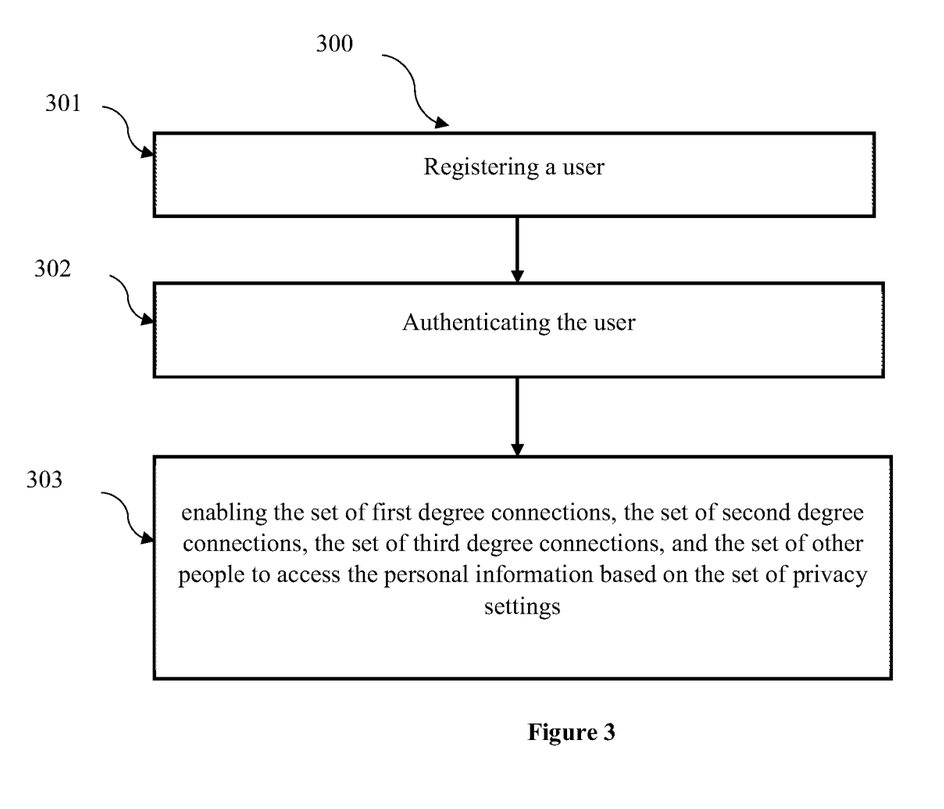
FIG. 3 illustrates a method 300 for sharing the user's personal data, in accordance with an embodiment of the present disclosure.

Now referring to FIG. 3, a method 300 for sharing the user's personal data is illustrated, in accordance with an embodiment of the present subject matter.

At step 301, the processor 201 may be configured for registering a user over the system 101. The detailed steps for registering a user over the system 101 are further elaborated with reference to FIG. 4.

At step 302, the processor 201 may be configured for authenticating a user over the system 101. The detailed steps for authenticating a user over the system 101 are further elaborated with reference to FIG. 5.

At step 303, the processor 201 may be configured for enabling the set of first degree connections, the set of second degree connections, the set of third degree connections, and the set of other people to access the personal information based on the set of privacy settings. It must be noted that the user may be a social network user. The method may enable the user to grant her connections granular visibility into her personal data without granting the same visibility to the network operator. The network operator may be any social media network operator such as Facebook®, Linkedin®, and Twitter®. Since, the method enables the user to control granular visibility of her personal data, there is no means by which the network operator can access her personal data. This removes the need for the user to trust the network operator to safeguard her personal data.

Figure 4:
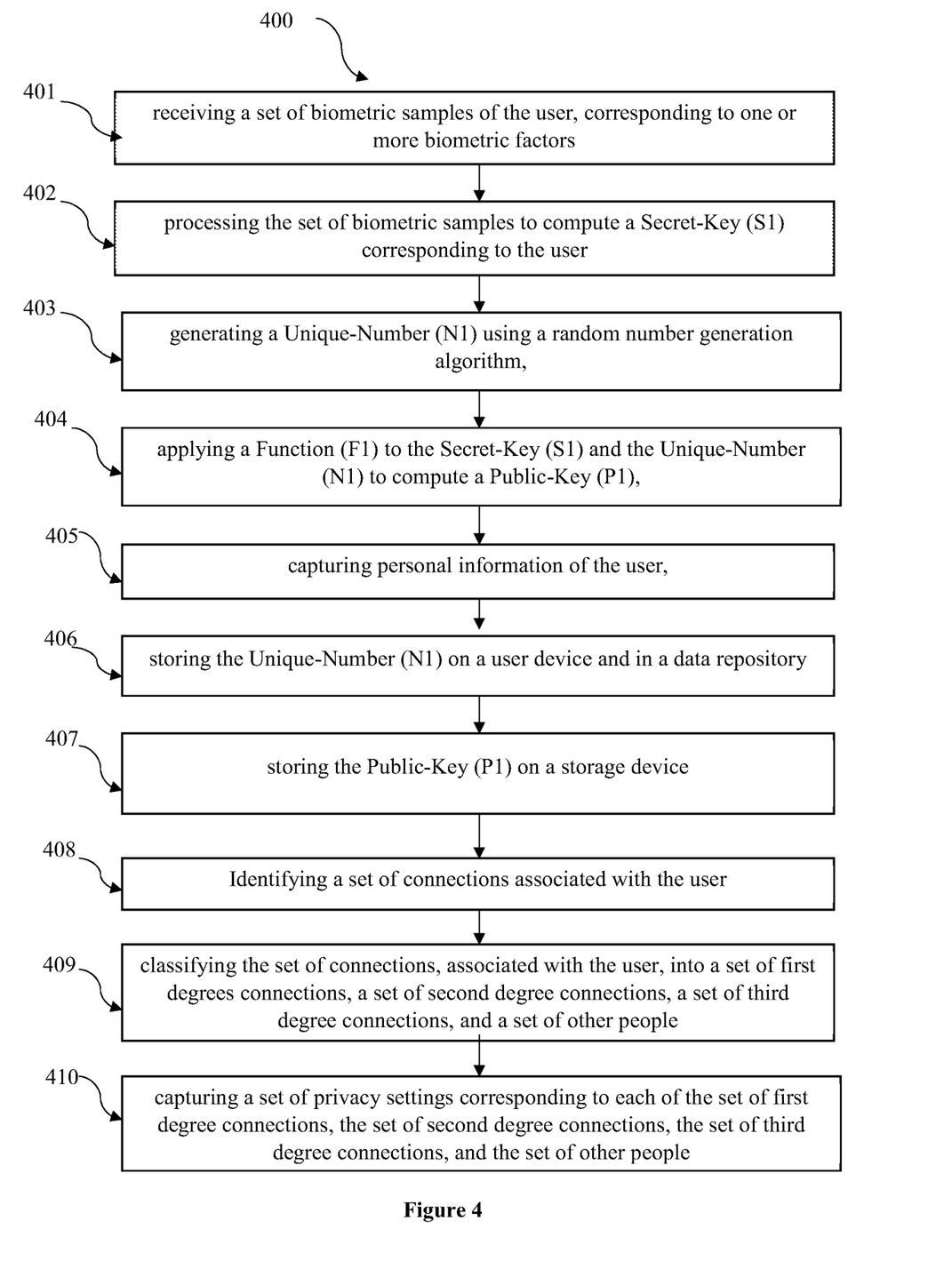
FIG. 4 illustrates a method 400 for user registration, in accordance with an embodiment of the present disclosure.

Now referring to FIG. 4, a method 400 for user registration is illustrated, in accordance with an embodiment of the present subject matter.

At step 401, the processor 201 may be configured for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein.

At step 402, the processor 201 may be configured to process the set of biometric samples to compute a Secret-Key (S1) corresponding to the user. For the purpose of computing the secret key (S1) a set of unique characteristics of the biometric samples may be determined. These unique characteristics must be reproducible every time the user scans their biometrics.

At step 403, the processor 201 may be configured to generate a Unique-Number (N1). The Unique-Number (N1) can be computed using any random number generation algorithm. The Unique-Number (N1) is a random number generated only once by the random number generation algorithm.

At step 404, the processor 201 may be configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1).

At step 405, the processor 201 may be configured to capture personal information of the user. The personal information is classified into the first degree personal information, the second degree personal information, the third degree personal information, and other personal information.

In one embodiment, the set of first degree connection corresponds to users in a social network who are directly connected to the user, the set of second degree connections corresponds to users in a social network who are indirectly connected to the user over a social network, and the set of third degree connections corresponds to users in a social network who are not directly or indirectly connected with the user, and wherein the set of other people are users which are not part of the social network.

In one exemplary embodiment, the set of first degree connections corresponds to users on Facebook® or Linkedin® who are directly connected to the user. The set of second degree connections corresponds to users on Facebook® or Linkedin® who are not directly connected to the user but have mutual connections. The set of third degree connections corresponds to users on Facebook® or Linkedin® who are not directly or indirectly connected to the user and have no mutual connections. The set of other people are users who are not part of the social network.

At step 406, the processor 201 may be configured to store the Unique-Number (N1) on the user device 103 and in a Data Repository 208.

At step 407, the processor 201 may be configured to store the Public-Key (P1) on a storage device. Further, multiple users may be registered over the system 101. Every time the user makes a request to access the system 101, the Unique-Number (N1) and the Public-Key (P1) are used for authentication.

At step 408, the processor 201 may be configured for identifying a set of connections associated with the user.

At step 409, the processor 201 may be configured for classifying the set of connections, associated with the user, into the set of first degree connections, a set of second degree connections, a set of third degree connections, and a set of other people.

At step 410, the processor 201 may be configured for capturing a set of privacy settings corresponding to each of the set of first degree connections, the set of second degree connections, the set of third degree connections, and the set of other people. The set of privacy settings are captured from the user. The first degree personal information is accessible to the set of first degree connections. The second degree personal information is accessible to the set of second degree connections. The third degree personal information is accessible to the set of third degree connections. The other personal information is accessible to the set of other people. In one embodiment, the first degree personal information may correspond to the year of birth of the user and the like. The second degree personal information may correspond to the employer of the user and the like. The third degree personal information may correspond to the country of residence of the user and the like. It must be noted that the Secret-Key (S1) is not stored on the user device 103 or the system 101. Rather, at the time of authentication, the Secret-Key (S2) is computed in real-time. The process for user authentication is stated below with reference to the flow chart of FIG. 5.

Figure 5:
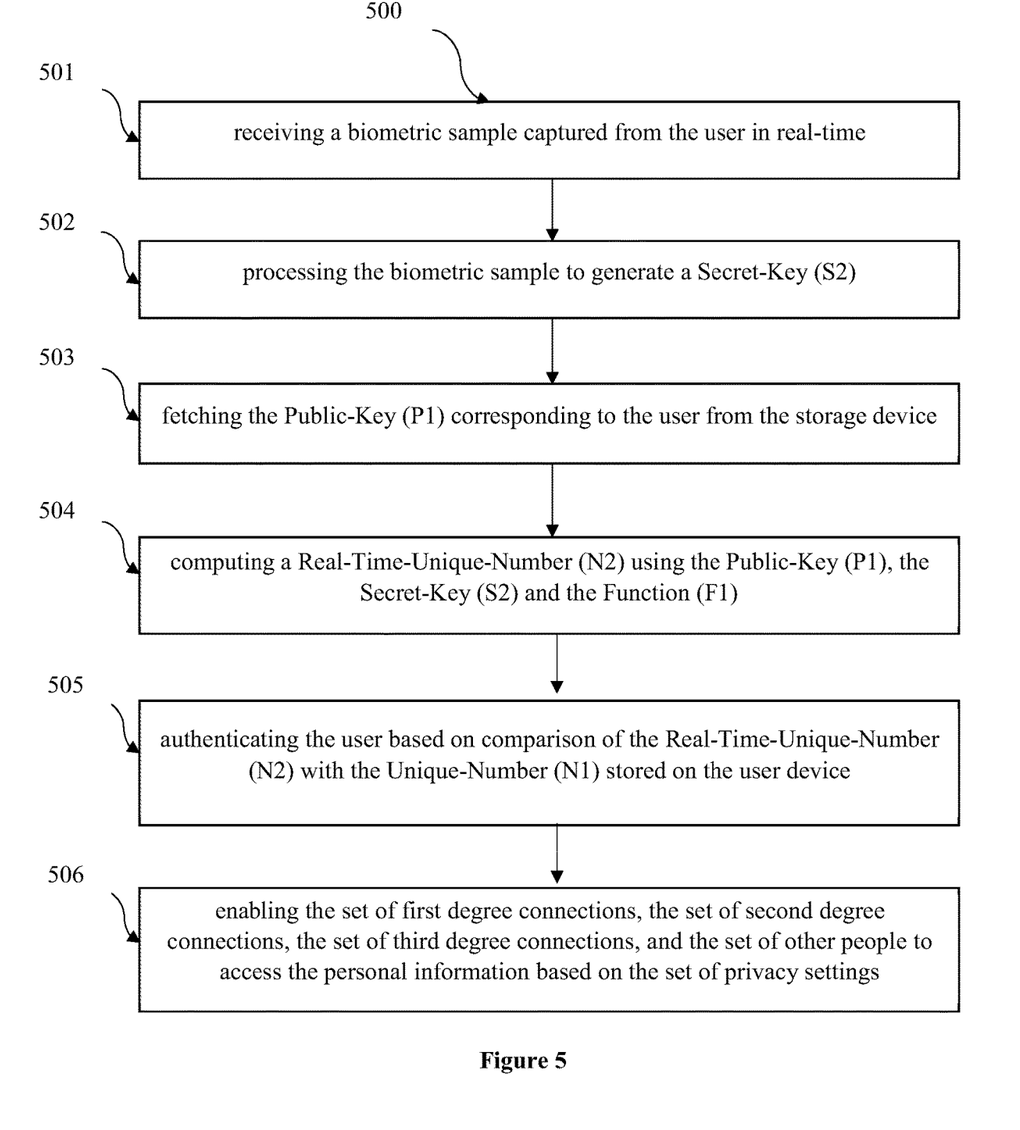
FIG. 5 illustrates a method 500 for user authentication, in accordance with an embodiment of the present disclosure.

Now referring to FIG. 5, a method 500 for user authentication is illustrated, in accordance with an embodiment of the present subject matter.

At step 501, the processor 201 may be configured to receive a biometric sample from the user. The biometric sample may be captured from the user in real-time.

At step 502, the processor 201 may be configured to process the biometric sample to generate a Secret-Key (S2). It must be noted that the Secret-Key (S2) will be different from Secret-Key (S1) if the user is not the same person.

At step 503, the processor 201 may be configured to fetch the Public-Key (P1) corresponding to the user from the user device 103.

At step 504, the processor 201 may be configured to compute a Real-Time-Unique-Number (N2) using the Public-Key (P1), the Secret-Key (S2) and the Function (F1).

At step 505, the processor 201 may be configured to authenticate the user based on comparison of the Real-Time-Unique-Number (N2) with the Unique-Number (N1) stored on the user device 103. It must be noted that when biometric samples from the same user are captured, the Secret-Key (S2) generated in real-time is the same as the Secret-Key (S1) that was generated during user registration. As a result, the Real-Time-Unique-Number (N2) generated using the Public-Key (P1), the Secret-Key (S2) and the Function (F1) will be the same as the Unique-Number (N1) stored on the user device. In case false biometric samples are provided during authentication, the Secret-Key (S2) generated in real-time will not be the same as the Secret-Key (S1). Due to this, the Real-Time-Unique-Number (N2) will not match the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

At step 506, if the user is successfully authenticated, the processor 201 may be configured to execute programmed instructions stored in the memory for enabling the set of first degree connections, the set of second degree connections, the set of third degree connections, and the set of other people to access the personal information based on the set of privacy settings. For this purpose, the connections associated with the user may log into the social network 102. Once a connection associated with the user logs in and requests for accessing the data associated with the user, the system 101 is first configured to identify a classification associated with the connection. The information shared with the connection depends on the classification associated with the connection. For example, if the user has classified the connection as a first degree connection, then the first degree personal information is shared with the connection.

Although implementations for the system 101 and the method 300 for enabling social network users to grant their connections granular visibility into their personal data without granting the same visibility to the network operator have been described in language specific to structural features and methods, it must be understood that the claims are not limited to the specific features or methods described. Rather, the specific features and methods are disclosed as examples of implementations for the system 101 and the method 300 for enabling social network users to grant their connections granular visibility into their personal data without granting the same visibility to the network operator.

The invention claimed is:

1. A system for enabling social network users to grant their connections granular visibility into their personal data without granting the same visibility to the network operator, comprising:
 a processor and a memory coupled to the processor, wherein the processor is configured to execute instructions stored in the memory for:
 registering a user by,
  receiving a set of biometric samples of the user, corresponding to one or more biometric factors,
  processing the set of biometric samples to compute a Secret-Key (S1) corresponding to the user,
  generating a Unique-Number (N1) using a random number generation algorithm,
  applying a Function (F1) to the Secret-Key (S1) and the Unique-Number (N1) to compute a Public-Key (P1),
  capturing personal information of the user, wherein the personal information is classified into a first degree personal information, a second degree personal information, a third degree personal information, and other personal information,
  storing the Unique-Number (N1) on a user device and in a data repository,
  storing the Public-Key (P1) on a storage device,
  identifying a set of connections associated with the user,
  classifying the set of connections, associated with the user, into a set of first degree connections, a set of second degree connections, a set of third degree connections, and a set of other people,
  capturing a set of privacy settings corresponding to each of the set of first degree connections, the set of second degree connections, the set of third degree connections, and the set of other people, wherein the set of privacy settings are captured from the user, wherein a first degree personal information is accessible to the set of first degree connections, wherein a second degree personal information is accessible to the set of second degree connections, and wherein a third degree personal information is accessible to the set of third degree connections, and wherein other personal information is accessible to the set of other people;
 authenticating the user by,
  receiving a biometric sample captured from the user in real-time,
  processing the biometric sample to generate a Secret-Key (S2),
  fetching the Public-Key (P1) corresponding to the user from the user device,
  computing a Real-Time-Unique-Number (N2) using the Public-Key (P1), the Secret-Key (S2) and the Function (F1), and
  authenticating the user based on comparison of the Real-Time-Unique-Number (N2) with the Unique-Number (N1) stored on the user device; and
 enabling the set of first degree connections, the set of second degree connections, the set of third degree connections and the set of other people to access the personal information based on the set of privacy settings.

2. The system of claim 1, wherein the one or more biometric factors correspond to fingerprint, face, voice, retina, and palm vein, wherein the set of biometric samples are captured by the user device.

3. The system of claim 1, wherein the personal information is classified based on user inputs.

4. The system of claim 1, wherein the set of first degree connections corresponds to users in a social network who are directly connected to the user, the set of second degree connections corresponds to users in a social network who are indirectly connected to the user over a social network, and the set of third degree connections corresponds to users in a social network who are not directly or indirectly connected with the user, and wherein the set of other people are users who are not part of the social network.

5. A method for enabling social network users to grant their connections granular visibility into their personal data without granting the same visibility to the network operator, the method comprising steps of:
 registering a user by,
  receiving a set of biometric samples of the user corresponding to one or more biometric factors,
  processing the set of biometric samples to compute a Secret-Key (S1) corresponding to the user,
  generating a Unique-Number (N1) using a random number generation algorithm,
  applying a Function (F1) to the Secret-Key (S1) and the Unique-Number (N1) to compute a Public-Key (P1),
  capturing personal information of the user, wherein the personal information is classified into a first degree personal information, a second degree personal information, a third degree personal information and other personal information,
  storing the Unique-Number (N1) on a user device and in a data repository,
  storing the Public-Key (P1) on a storage device,
  identifying a set of connections associated with the user,
  classifying the set of connections, associated with the user, into a set of first degree connections, a set of second degree connections, a set of third degree connections, and a set of other people,
  capturing a set of privacy settings corresponding to each of the set of first degree connections, the set of second degree connections, the set of third degree connections, and the set of other people, wherein the set of privacy settings are captured from the user, wherein a first degree personal information is accessible to the set of first degree connections, wherein a second degree personal information is accessible to the set of second degree connections, and wherein a third degree personal information is accessible to the set of third degree connections, and wherein other personal information is accessible to the set of other people;

authenticating the user by,
  receiving a biometric sample captured from the user in real-time,
  processing the biometric sample to generate a Secret-Key (S2),
  fetching the Public-Key (P1) corresponding to the user from the user device,
  computing a Real-Time-Unique-Number (N2) using the Public-Key (P1), the Secret-Key (S2) and the Function (F1), and
  authenticating the user based on comparison of the Real-Time-Unique-Number (N2) with the Unique-Number (N1) stored on the user device; and enabling the set of first degree connections, the set of second degree connections, the set of third degree connections, and the set of other people to access the personal information based on the set of privacy settings.

6. The method of claim 5, wherein the one or more biometric factors correspond to fingerprint, face, voice, retina, and palm vein, wherein the set of biometric samples are captured by the user device.

7. The method of claim 5, wherein the personal information is classified based on user inputs.

8. The method of claim 5, wherein the set of first degree connections corresponds to users in a social network who are directly connected to the user, the set of second degree connections corresponds to users in a social network who are indirectly connected to the user over a social network, and the set of third degree connections corresponds to users in a social network who are not directly or indirectly connected with the user, and wherein the set of other people are users who are not part of the social network.

* * * * *